United States Patent
Braun

(10) Patent No.: US 7,824,176 B2
(45) Date of Patent: Nov. 2, 2010

(54) NEEDLE VALVE NOZZLE

(75) Inventor: Peter Braun, Hungen (DE)

(73) Assignee: Ewikon Heisskanalsysteme GmbH & Co. KG, Frankenberg (DE)

( * ) Notice: Subject to any disclaimer, the term of this patent is extended or adjusted under 35 U.S.C. 154(b) by 239 days.

(21) Appl. No.: 12/293,229

(22) PCT Filed: Apr. 2, 2007

(86) PCT No.: PCT/EP2007/053171

§ 371 (c)(1),
(2), (4) Date: Sep. 16, 2008

(87) PCT Pub. No.: WO2007/115969

PCT Pub. Date: Oct. 18, 2007

(65) Prior Publication Data

US 2009/0074906 A1   Mar. 19, 2009

(30) Foreign Application Priority Data

Apr. 8, 2006  (DE) ............. 20 2006 005 154
Aug. 18, 2006 (DE) ............. 20 2006 012 676

(51) Int. Cl.
*B29C 45/23* (2006.01)
(52) U.S. Cl. .................... 425/564; 425/566
(58) Field of Classification Search ........... 425/562, 425/563, 564, 565, 566
See application file for complete search history.

(56) References Cited

U.S. PATENT DOCUMENTS

| 4,595,552 | A |   | 6/1986  | Hahn |
| 5,509,797 | A | * | 4/1996  | Nakamura ............ 425/564 |
| 5,511,968 | A | * | 4/1996  | Guzzini et al. ....... 425/564 |
| 5,834,041 | A | * | 11/1998 | Sekine et al. ........ 425/564 |
| 2003/0068404 | A1 |   | 4/2003 | Murayama et al. |

FOREIGN PATENT DOCUMENTS

| DE | 102005024331 | 1/2006 |
| JP | 07-144347 A | 6/1995 |
| JP | 07-251428 A | 10/1995 |

OTHER PUBLICATIONS

"Ewikon—Heiβkanalforum mit Produktpremiere". Plastverarbeiter, [Online] May 22, 2006, URL: http://www.plastverarbeiter.de/news/6b78fddafe9.html.
"Hotline Feb. 2006", Kundenzeitschrift Ewikon, [Online] Oct. 2006 sections 1-8. URL:http://www.ewikon.de/dowload/prospekte/hotline_022006.pdf.

* cited by examiner

*Primary Examiner*—Tim Heitbrink
(74) *Attorney, Agent, or Firm*—Barnes & Thornburg LLP

(57) ABSTRACT

A feature of a needle valve nozzle positioned in a hot-runner injection mould and actuated by means of an actuator, where the direction of actuation of the shut-off needle and that of the flow channel in the hot-runner nozzle differ from one another, is that, in the closed position, the shut-off needle (13), as distinct from the actuation device (12), is held in position, in the closed position, exclusively by the cooler mould plate (2) at at least two locations at a distance from one another.

19 Claims, 6 Drawing Sheets

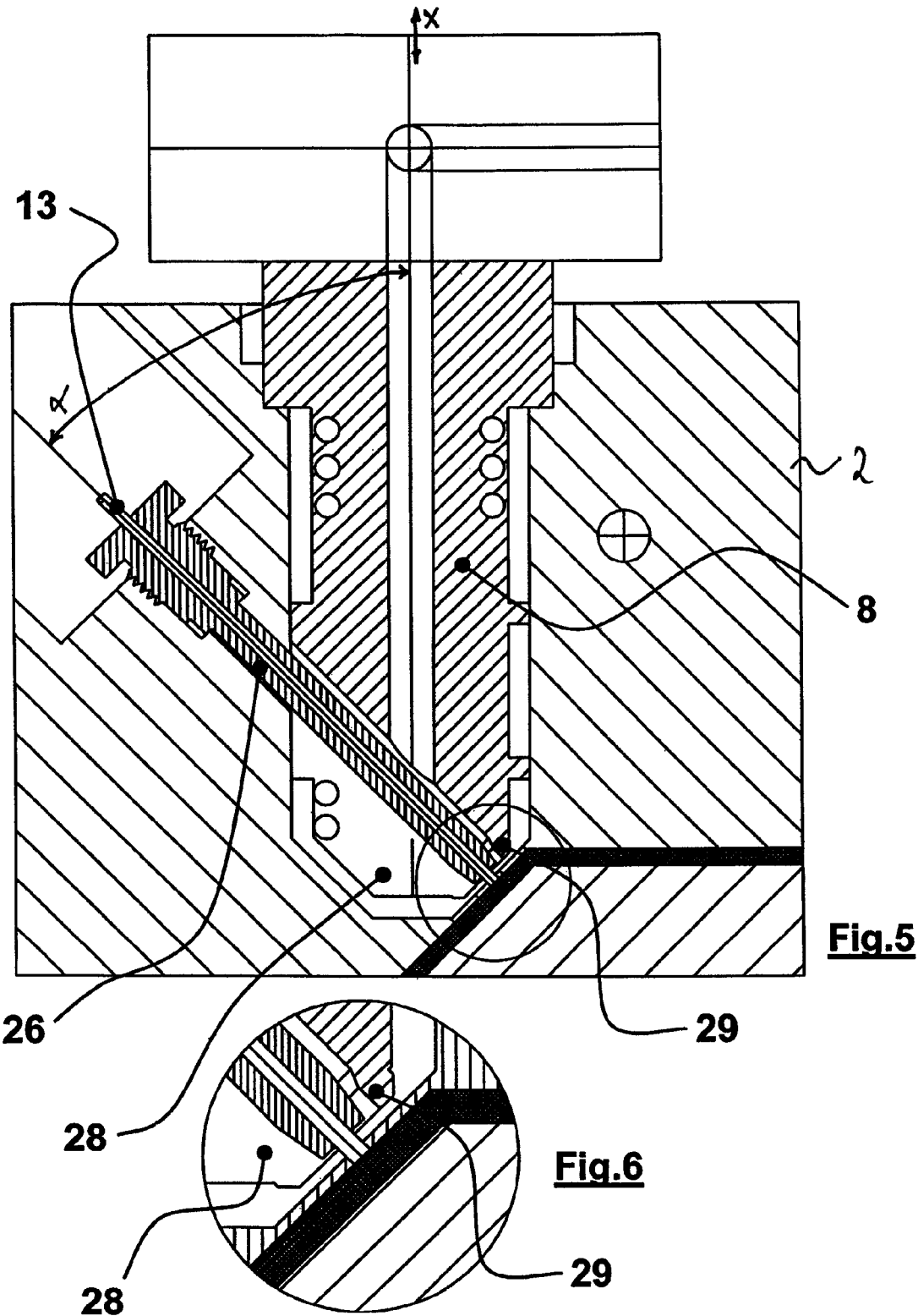

NEEDLE VALVE NOZZLE

CROSS-REFERENCE TO RELATED APPLICATION(S)

This application is a National Stage United States Patent Application that relies for priority on International Patent Application No. PCT/EP2007/053171, which was filed on Apr. 2, 2007. This application also relies for priority on German Patent Application No. 20 2006 005 154.6, which was filed on Apr. 8, 2006. In addition, this application relies for priority on German Patent Application No. 20 2006 012 676.7, which was filed on Aug. 18, 2006. The contents of all three applications are incorporated herein by reference.

DESCRIPTION OF THE RELATED ART

Needle valve nozzles are known to a person skilled in the art.

For example, DE 10 2005 024 331 A1 shows a needle valve nozzle with the flow channel of the nozzle and the actuating direction of the shut-off needle extending in parallel.

Patent Abstracts of Japan 07-251428 shows a construction with a shut-off needle arranged at an angle to the flow channel.

With the shut-off needle extending at an angle to the flow channel, problems occur, since it is in operative connection with, or passes through, components of a hot-runner injection mold that are operated at different temperatures.

SUMMARY OF THE INVENTION

A hot-runner injection mold generally comprises on the one hand components that form the mold cavity and, because of the desired short setting time of the melt, are cooled by means of suitable media, designated by K in FIG. 1, and on the other hand components that guide and direct the melt, designated by W in FIG. 1. Since, by contrast with the cooled components, the components that come into contact with the melt must not cool the melt, these components are heated.

The fact that, as explained above, regions of a hot-runner injection mold are at different temperatures for operating reasons has the consequence that displacements are caused by different thermal expansions. In particular in the case of needle valve nozzles with actuating directions of the needle that do not extend parallel to the flow channel, this often has the effect that the shut-off needle and the sealing seat, forming the closure with it, in the actuating wall of the mold plate forming the cavity are not axially in line.

The object of the invention is to overcome this disadvantage.

Advantageous refinements of the invention as well as other aspects of the invention should become apparent to those skilled in the art.

BRIEF DESCRIPTION OF THE DRAWINGS

The invention is explained by the graphic representations and the description which follows.

In the drawings:

FIG. 5 shows a section through a third hot-runner injection mold in the operating position of a closed shut-off needle;

FIG. 6 shows an enlargement of the cutout from FIG. 5;

DETAILED DESCRIPTION OF EMBODIMENT(S) OF THE INVENTION

A wide variety of different types of hot-runner injection molds are sufficiently well known to a person skilled in the art to make it unnecessary to discuss them in detail here. It is noted that the embodiments discussed herein are intended to be exemplary of the invention and are not intended to limit the scope thereof.

Figures 1, 2:
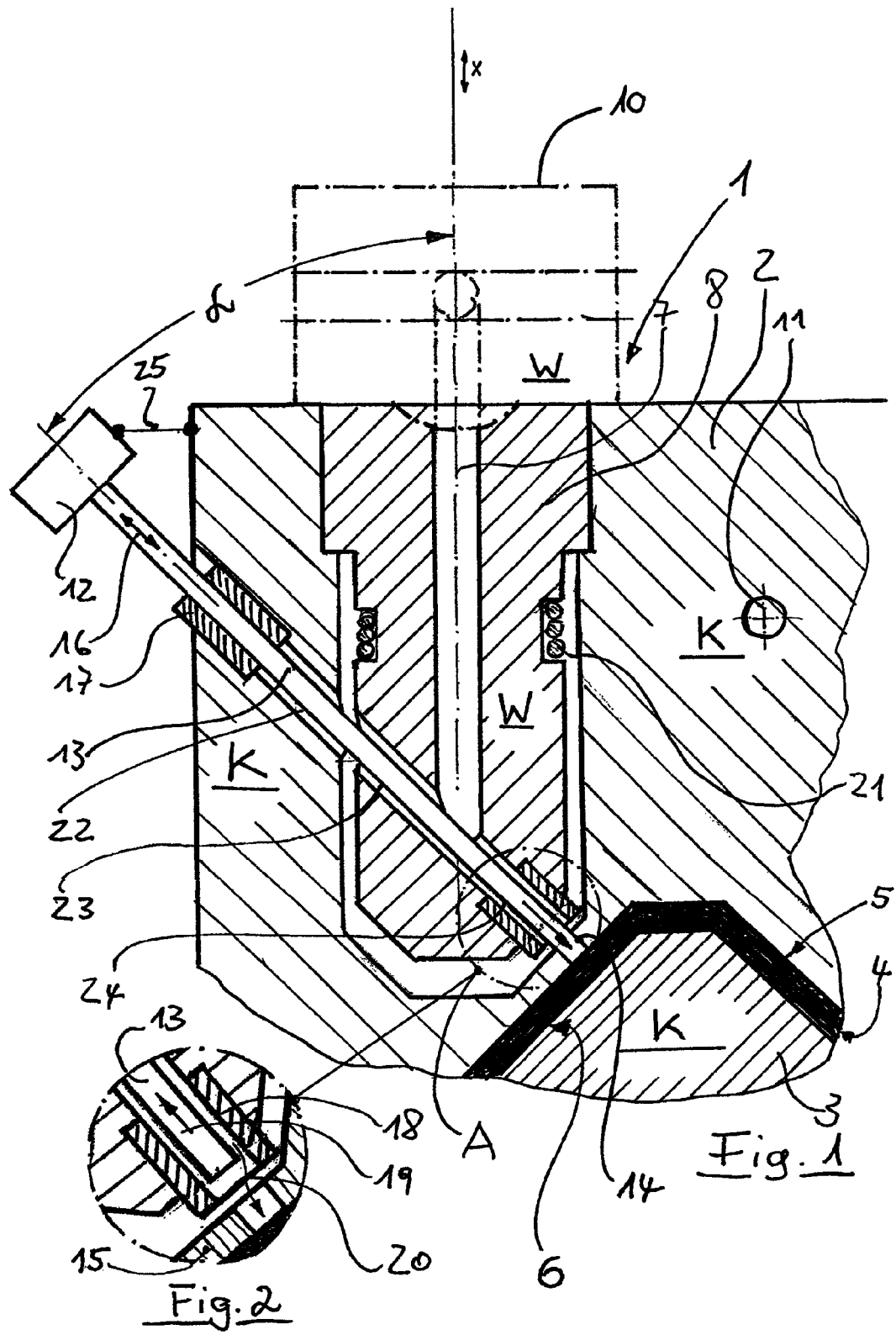
FIG. 1 shows a cross-sectional schematic representation, through a hot-runner injection mold in the operating position, of a closed shut-off needle.
FIG. 2 shows a cutout according to detail A in FIG. 1, illustrating the operating position of an opened shut-off needle.

FIG. 1 shows the main components of a hot-runner injection mold 1, comprising the mold plate 2 and the mold core 3 as main components. Together, the mold plate 2 and the mold core 3 form a cavity 4, which is partially represented in the illustration. The cavity 4 gives the molding 5 its shape in the set state. In other words, the cavity 4 defines the shape of the object to be formed by the injection mold.

A molding that has a wall 6 extending at an angle to the flow channel 7 of the hot-runner nozzle 8 is described.

The melt enters the hot-runner injection mold 1 either through a nozzle (not represented) that is connected to the injection-molding machine and goes into the hot-runner nozzle 8 or is fed to the hot-runner nozzle 8 via a hot-runner manifold 10.

The temperature distribution in the graphically represented components of the hot-runner injection mold 1 is conducted in such a way that, in relation to the hot-runner nozzle 8, the mold plate 2 represents the cooler component, which optionally includes cooling channels 11 that pass therethrough. By contrast, the hot-runner nozzle 8 is heated. This heating is schematically indicated by heating coils 21.

The shut-off needle 13 is connected by its end remote from the hot-runner nozzle 8 to an actuating device 12, which may be formed in accordance with the known prior art and can move the shut-off nozzle 13 in the directions of the double-headed arrow. The line 25 is intended to indicate that the actuating device 12 is connected, in mechanical engineering terms, to the hot-runner injection mold 1.

In FIG. 1, the needle 13 is shown in the closed position. The needle 13 enters the wall 15 of the mold plate 2 and creates a sealing seat 14. The molding 5 is in this way separated from the flow channel 7 and the gaps 22, 23, and 24.

In FIG. 2, the detail A identified in FIG. 1 is shown in an enlarged format. The detail A illustrates the shut-off needle 13 in the opened position, after movement in the direction of the arrow 19. When in the opened position, the needle 13 forms a flow path 20, by which the mold cavity 4 can be filled with the melt.

The figures illustrate the concept of the invention of this application very clearly.

Apart from the actuating device 12, the shut-off needle 13 is held in place exclusively by the cooler mold plate 2. The guiding and sealing sleeve 17 is seated in the cooler mold plate 2. A threaded connection may be used to connect advantageously the sealing sleeve 17 in the cooler mold plate 2. This guiding and sealing bushing 17 assumes the temperature of the cooler mold plate 2 and is, therefore, likewise to be considered to be cool.

A further bushing 18 can be seen at the free end of the shut-off needle 13. This serves as a heat conducting sleeve and is not in contact with the shut-off needle 13. Instead, the bushing 18 serves to conduct heat from the heated hot-runner nozzle 8 as far as possible into the wall 15, in order to prevent disadvantageous cooling of the melt in the region of the wall 15 before it enters the mold cavity 4.

This makes it clear that the shut-off needle 13 only has contact with cooler regions of the mold plate 2. On the one hand, the shut-off needle 13 has contact with the cool guiding and sealing bushing 17. On the other hand, the shut-off needle 13 has contact with the wall 15, with which it forms a sealing seat.

The invention is not restricted to a specific angle between the shut-off needle 13 and the flow channel 7. It is therefore within the scope of the invention to make the angle both greater and smaller than the graphically represented angle of about 45° without departing from the concept of the invention.

Figures 3, 4:
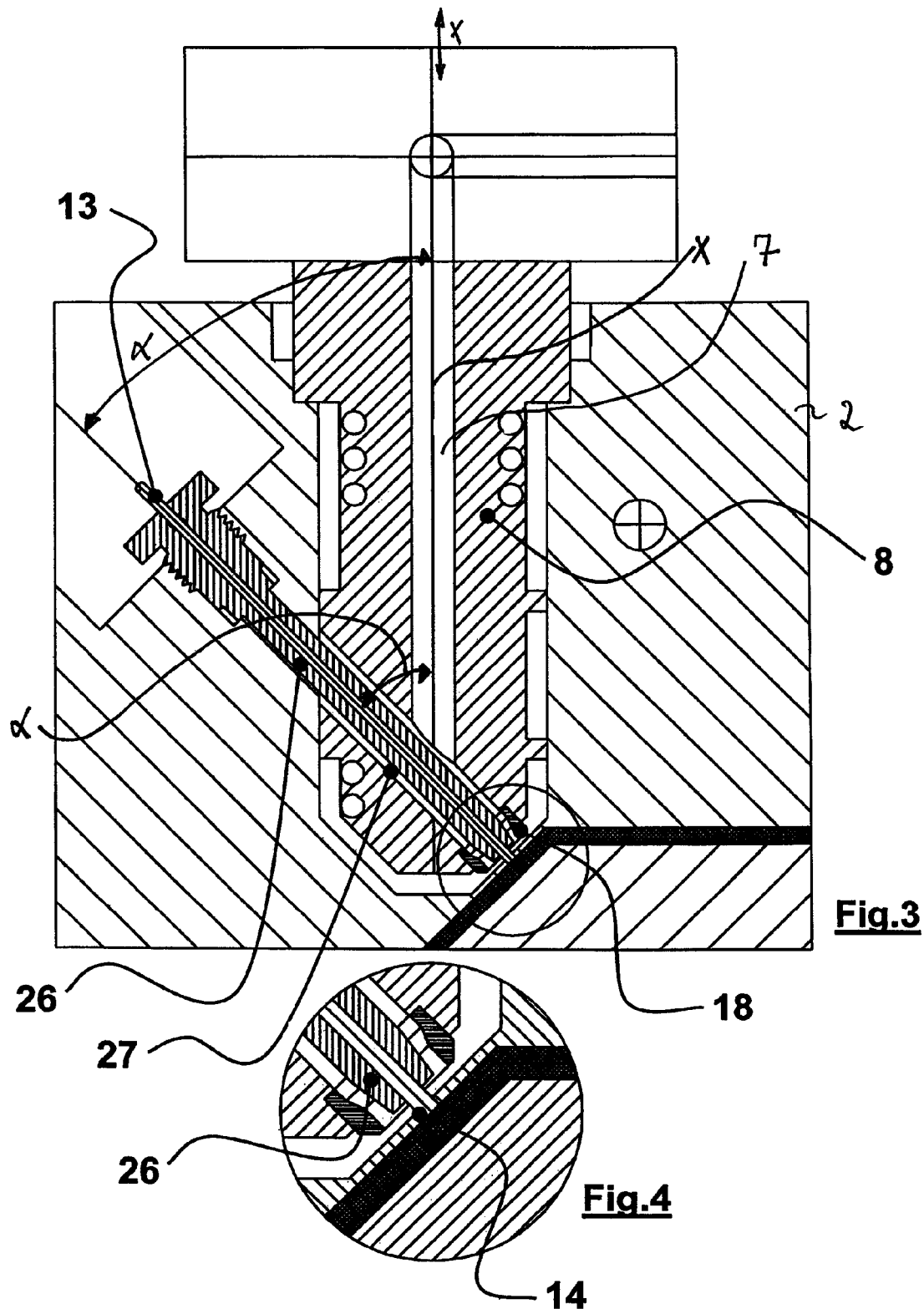
FIG. 3 shows a sectional view of a cutout of a further hot-runner injection mold with a closed shut-off needle.
FIG. 4 shows an enlargement of the cutout from FIG. 3.
Figure 7:
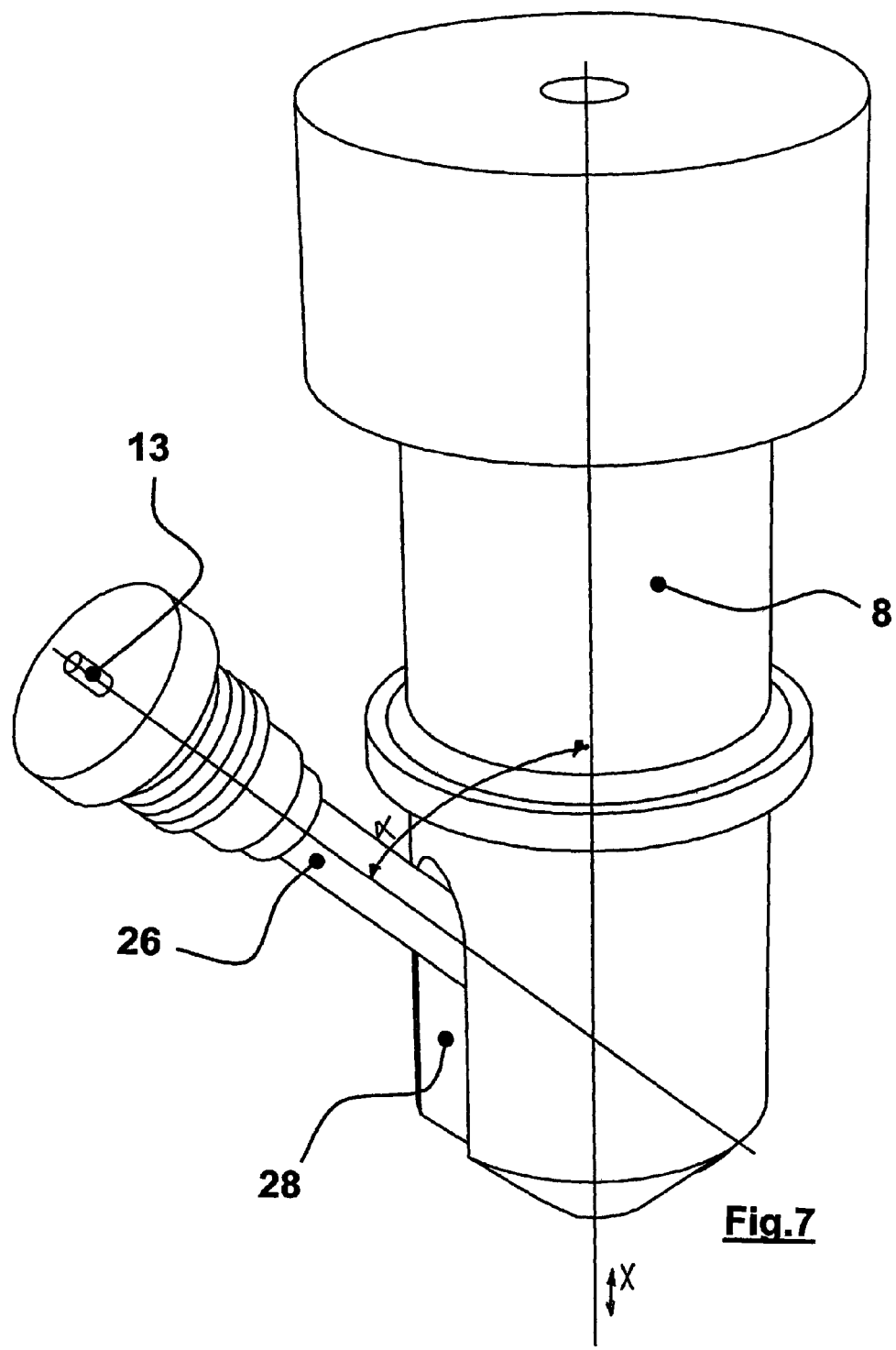
FIGS. 7 to 9 show various further perspective views, some in section, of the exemplary embodiment from FIG. 5.
Figure 8:
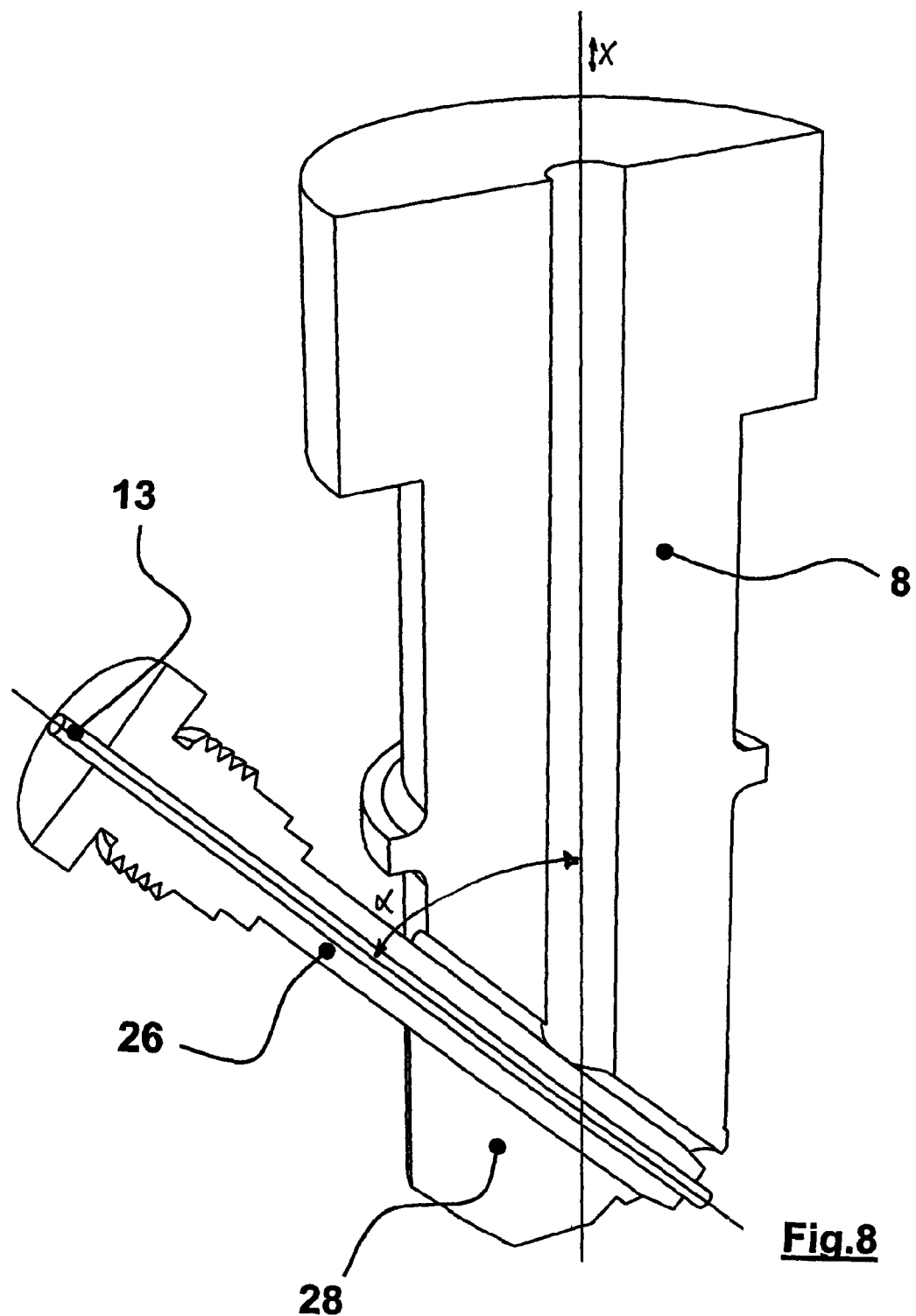
Figure 9:
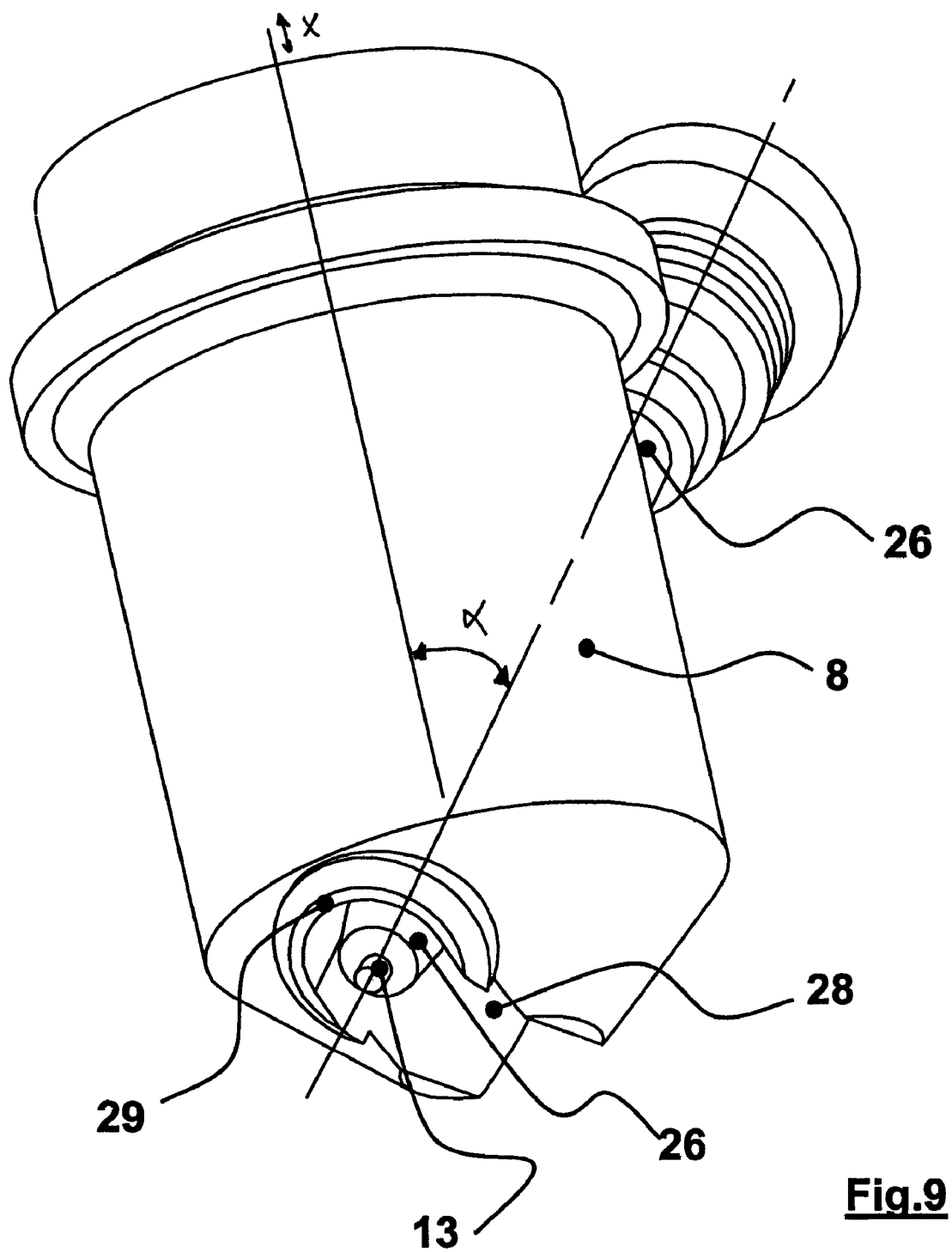

FIGS. 3 and 4 show a further exemplary embodiment of the invention in which the shut-off needle 13 is, once again, in the closed position. In these illustrations, the shut-off needle 13 is held in place at two spaced-apart locations in the cooler, mold plate 2.

The shut-off needle 13 and the guiding and sealing sleeve 26 (needle guide) pass through a through-bore 27 (FIGS. 3 and 4) or a gap 28 (FIGS. 5 to 9) in the hot-runner nozzle 8. It is noted that the shut-off needle 13 is longer by comparison with the shut-off needle illustrated in FIG. 1. The shut-off needle 13 is aligned at an angle $\alpha > 0°$ and preferably $< 90°$. In particular the angle $\alpha$ is between 30 to 60°, preferably $\alpha = 45°$, in relation to the axis of longitudinal extent X of the hot-runner nozzle 8 or in relation to the flow channel 7. In the closed position, the shut-off needle 13 in this case passes completely through the hot-runner nozzle 8 at the angle $\alpha$. In the closed position, moreover, a sealing seat 14 is formed with respect to the mold plate 2, with the free end of the shut-off needle 13 entering the seat in this position.

The shut-off needle 13 is once again held at its end remote from the sealing seat 14—with respect to the closed position—by the guiding and sealing sleeve 26 in the cooler mold plate 2. The guiding and sealing sleeve 26 extends into the through-bore 27 (FIG. 3) or the groove 28 (FIG. 5) of the hot-runner nozzle 8. Specifically, the guiding and sealing sleeve 26 preferably extends into the region of the bushing 18, which serves as a heat conducting sleeve. The needle guide or guiding and sealing sleeve 26 may also extend to just before the bushing 18 or to beyond the bushing 18, to be precise, to just before the sealing seat 14.

The guiding and sealing sleeve 26, lengthened in this way, optimizes or enhances the guidance of the shut-off needle 13 and stabilizes it further in the direction of the second guiding position on the sealing seat 14.

To simplify the assembly and disassembly of the hot-runner nozzle 8 or the shut-off needle 13, the hot-runner nozzle 8 may also be provided with an obliquely introduced groove 28 (see FIGS. 5 to 9) instead of a through-bore 27.

This has the advantage that fitting and removal of the hot-runner nozzle 8 is possible without having to disassemble the shut-off needle 13 including its needle guide 26. FIG. 5 is illustrative of this feature.

The heat conducting element that is used—bushing 18—as shown in FIGS. 1 to 3 may also be formed—in particular with the groove configuration of FIG. 5—as an integral part of the nozzle body 8 in the form of a heat conducting continuation 29.

As may be appreciated by those skilled in the art, and as made apparent above, there are numerous variations and equivalents that may be appreciated by those skilled in the art. Those variations and equivalents are intended to be encompassed by the scope of the invention.

The invention claimed is:

1. A needle valve nozzle actuated by a power operated actuating device in a hot-runner injection mold, comprising a hot-runner nozzle with a flow channel and a cooler, mold plate, wherein
   a. the actuating direction of the shut-off needle and that of the flow channel of the hot-runner nozzle differ from each other,
   b. apart from the actuating device, the shut-off needle is held in place in the closed position exclusively by the cooler mold plate at at least two spaced-apart locations,
   c. one of the at least two locations is a guiding and sealing sleeve, which is seated in the cooler mold plate, and
   d. the guiding and sealing sleeve extends into the hot-runner nozzle without contacting said nozzle, so that a gap remains between the guiding and sealing sleeve and the hot-runner nozzle.

2. The needle valve nozzle as claimed in claim 1, wherein the seat of the guiding and sealing sleeve in the cooler mold plate is a screw connection comprising at least one of a one-part or multi-part form.

3. The needle valve nozzle as claimed in claim 1, wherein a second location of the at least two locations is formed by the sealing seat of the shut-off nozzle when the shut-off nozzle is in the closed position.

4. The needle valve nozzle as claimed in claim 1, wherein the guiding and sealing sleeve extends into a region of a heat conducting element, the heat conducting element comprising a bushing.

5. The needle valve nozzle as claimed in claim 1, wherein the guiding and sealing sleeve extends to just before the sealing seat of the shut-off nozzle when in the closed position.

6. The needle valve nozzle as claimed in claim 1, wherein the hot-runner nozzle is provided with a through-bore, which is aligned at an angle $\alpha$ of at least one of >0°, 30 to 60°, and 45°, in relation to the axis of a longitudinal extent of the hot-runner nozzle.

7. The needle valve nozzle as claimed in claim 1, wherein the hot-runner nozzle has a lateral groove introduced obliquely in relation to the axis of longitudinal extent of the hot-runner nozzle at an angle $\alpha$ greater than 0°.

8. The needle valve nozzle according to claim 1, wherein the shut-off nozzle is held in place by means of a guiding and sealing sleeve in the mold plate.

9. An injection mold, comprising:
   a mold plate defining at least a portion of a mold cavity into which a melt is injected through an opening, the portion of the mold plate surrounding the opening defining a sealing seat;
   a hot-runner nozzle disposed in the mold plate, the hot-runner nozzle defining a flow channel to direct the melt into the mold cavity, the hot-runner nozzle defining a first axis;
   a needle extending from the flow channel to the opening to control flow of the melt into the mold cavity, the needle defining a second axis;
   an actuating device connected to the needle to move the needle between an opened position where the needle disengages the sealing seat to permit the melt to flow into the mold cavity and a closed position where the needle engages the sealing seat to prevent the melt from flowing into the mold cavity;

a sleeve seated in the mold plate to guide the needle from the actuating device to the opening;

wherein the sleeve holds the needle in place at a first location in the mold plate, and wherein the first axis and the second axis are disposed at an angle with respect to one another.

10. The injection mold of claim 9, wherein:

the sleeve extends into the hot-runner nozzle, and a gap is defined between the sleeve and the hot-runner nozzle.

11. The injection mold of claim 9, wherein the sleeve is connected to the mold plate via a threaded connection.

12. The injection mold of claim 11, wherein the threaded connection is a single-part or multi-part connection.

13. The injection mold of claim 1, wherein the sealing seat holds the needle in place at a second location in the mold plate when the needle is in the closed position.

14. The injection mold of claim of claim 9, further comprising:

a bushing disposed in the hot-runner nozzle, the bushing being a heat-conducting element, wherein the sleeve extends into the bushing.

15. The injection mold of claim 9, wherein the sleeve extends from the first location to a point adjacent to the sealing seat.

16. The injection mold of claim 9, wherein the angle is greater than 0°.

17. The injection mold of claim 16, wherein the angle is between 30° and 60°.

18. The injection mold of claim 17, wherein the angle is 45°.

19. The injection mold of claim 9, wherein the hot-runner nozzle defines a groove in which the sleeve is disposed.

* * * * *